United States Patent
Yoon

(10) Patent No.: US 10,930,183 B2
(45) Date of Patent: Feb. 23, 2021

(54) HOLOGRAM CONTENT GENERATION APPARATUS, INTEGRATED HOLOGRAM CONTENT CONTROL SYSTEM HAVING THE SAME, AND METHOD FOR OPERATING THE HOLOGRAM CONTENT GENERATION APPARATUS

(71) Applicant: Electronics and Telecommunications Research Institute, Daejeon (KR)

(72) Inventor: Min-Sung Yoon, Daejeon (KR)

(73) Assignee: Electronics and Telecommunications Research institute, Daejeon (KR)

( * ) Notice: Subject to any disclaimer, the term of this patent is extended or adjusted under 35 U.S.C. 154(b) by 0 days.

(21) Appl. No.: 16/557,444

(22) Filed: Aug. 30, 2019

(65) Prior Publication Data

US 2020/0168138 A1 May 28, 2020

(30) Foreign Application Priority Data

Nov. 22, 2018 (KR) .......................... 10-2018-0145188
Apr. 24, 2019 (KR) .......................... 10-2019-0047889

(51) Int. Cl.
*G09G 3/00* (2006.01)
*G06K 9/00* (2006.01)
(Continued)

(52) U.S. Cl.
CPC ............. *G09G 3/001* (2013.01); *G06F 3/013* (2013.01); *G06F 3/016* (2013.01); *G06F 3/017* (2013.01);
(Continued)

(58) Field of Classification Search
CPC ..... G06F 3/01; G06F 3/13; G06F 3/16; G06F 3/17; G06K 9/255; G06K 9/604; G10L 15/22
(Continued)

(56) References Cited

U.S. PATENT DOCUMENTS 6,259,426 B1 * 7/2001 Harada ................ H04N 13/337
345/581
7,950,802 B2 5/2011 Schwerdtner et al.
(Continued)

FOREIGN PATENT DOCUMENTS

CN 105929962 B 12/2018
KR 101670328 B1 10/2016

OTHER PUBLICATIONS

You Seok Kim et al., "Speckle-Free Digital Hologram with Conversion to Off-Axis Horizontal-Parallax-Only Hologram," Korean Journal of Optics and Photonics, vol. 25, No. 2, pp. 85-89, Apr. 2014.

*Primary Examiner* — Prabodh M Dharia
(74) *Attorney, Agent, or Firm* — William Park & Associates Ltd.

(57) ABSTRACT

Disclosed herein are a hologram content generation apparatus, an integrated hologram content control system having the hologram content generation apparatus, and an operating method of the hologram content generation apparatus. The integrated hologram content control system includes a sensor unit configured to sense at least one of a face, motion, and voice of a user and generate sensing information, a hologram content generation apparatus configured to generate hologram content that enables interaction with the user using the sensing information, a display device configured to display the generated hologram content, and a rotation module for rotating the display device.

15 Claims, 11 Drawing Sheets

(51) Int. Cl.
*G06F 3/01* (2006.01)
*G10L 15/22* (2006.01)
*G02B 30/56* (2020.01)

(52) U.S. Cl.
CPC ..... *G06K 9/00255* (2013.01); *G06K 9/00604* (2013.01); *G10L 15/22* (2013.01); *G02B 30/56* (2020.01); *G09G 2354/00* (2013.01); *G10L 2015/223* (2013.01)

(58) Field of Classification Search
USPC ............ 345/156; 359/9; 715/733; 705/14.26
See application file for complete search history.

(56) References Cited

U.S. PATENT DOCUMENTS

| | | | |
|---|---|---|---|
| 9,500,470 | B2 | 11/2016 | Lee et al. |
| 9,508,195 | B2 * | 11/2016 | Heuvel ............... G06T 7/70 |
| 2010/0103485 | A1 * | 4/2010 | Haussler ............... G03H 1/02 359/9 |
| 2011/0249026 | A1 * | 10/2011 | Singh .................. G09G 3/36 345/630 |
| 2013/0235347 | A1 * | 9/2013 | Hennessey ........... G06F 3/013 351/210 |
| 2014/0033052 | A1 * | 1/2014 | Kaufman ............ H04N 13/388 715/733 |
| 2014/0122210 | A1 * | 5/2014 | Marshall ........... G06Q 30/0225 705/14.26 |
| 2014/0160588 | A1 * | 6/2014 | Aiki .................. G02B 6/0038 359/861 |
| 2014/0267599 | A1 * | 9/2014 | Drouin ............... G03H 1/2294 348/41 |
| 2016/0147003 | A1 * | 5/2016 | Morozov ............. G02B 27/10 359/11 |
| 2016/0216515 | A1 * | 7/2016 | Bouchier ............. G06T 19/006 |
| 2017/0060088 | A1 | 3/2017 | Kim et al. |
| 2017/0208292 | A1 * | 7/2017 | Smits ................. H04N 7/147 |
| 2020/0326554 | A1 * | 10/2020 | Yoon ................... G03H 1/02 |

* cited by examiner

HOLOGRAM CONTENT GENERATION APPARATUS, INTEGRATED HOLOGRAM CONTENT CONTROL SYSTEM HAVING THE SAME, AND METHOD FOR OPERATING THE HOLOGRAM CONTENT GENERATION APPARATUS

CROSS REFERENCE TO RELATED APPLICATIONS

This application claims the benefit of Korean Patent Application No. 10-2018-0145188, filed Nov. 22, 2018 and 10-2019-0047889, filed Apr. 24, 2019, which are hereby incorporated by reference in their entirety into this application.

BACKGROUND OF THE INVENTION

1. Technical Field

The present invention relates generally to a hologram content generation apparatus, an integrated hologram content control system having the hologram content generation apparatus, and a method for operating the hologram content generation apparatus.

2. Description of the Related Art

Generally, hologram display technology is configured to stereoscopically represent an object in a three-dimensional (3D) space, and is ideally fully realistic 3D display technology. In detail, hologram display technology is technology for providing the same effect as if a given object were actually present in front of human eyes as a wavefront of the corresponding object is reconstructed without change.

SUMMARY OF THE INVENTION

Accordingly, the present invention has been made keeping in mind the above problems occurring in the prior art, and an object of the present invention is to provide a hologram content generation apparatus that may acquire 3D content and display a full 3D image enabling interaction between a user and a reconstructed image, an integrated hologram content control system having the hologram content generation apparatus, and an operating method of the hologram content generation apparatus.

In accordance with an aspect of the present invention to accomplish the above object, there is provided an integrated hologram content control system, including a sensor unit configured to sense at least one of a face, motion, and voice of a user and generate sensing information; a hologram content generation apparatus configured to generate hologram content that enables interaction with the user using the sensing information; a display device configured to display the generated hologram content; and a rotation module configure to rotate the display device.

In an embodiment, the sensor unit may include a face recognition sensor configured to recognize positions of two eyes of the user.

In an embodiment, the face recognition sensor may identify a movement direction, a movement angle, and a movement speed of the user.

In an embodiment, the rotation module may be controlled based on data sensed by the face recognition sensor.

In an embodiment, the rotation module may be controlled by a unit step for a rotation angle, which is 0.35° (360°/1024) or less.

In an embodiment, the sensor unit may include a voice sensor configured to recognize a voice of the user.

In an embodiment, a rotation direction, a rotation angle or a rotation speed of the hologram content may be determined based on data sensed by the voice sensor.

In an embodiment, the sensor unit may include a motion sensor configured to recognize a motion or gesture of the user.

In an embodiment, a rotation direction, a rotation angle or a rotation speed of the hologram content may be determined based on data sensed by the motion sensor.

In an embodiment, the sensor unit may include a haptic sensor configured to sense a touch on the hologram content.

In an embodiment, the hologram content generation apparatus may generate binocular hologram data for providing a wide viewing angle.

In an embodiment, the hologram content generation apparatus may acquire 3D content of a scene or an object selected by a left-eye sensor and a right-eye sensor.

In an embodiment, the hologram content generation apparatus may acquire 3D information of a scene or object selected during a left-eye time and a right-eye time.

In accordance with another aspect of the present invention to accomplish the above object, there is provided a method for operating a hologram content generation apparatus, including acquiring binocular content for an object; generating left-eye computer-generated hologram (CGH) data and right-eye CGH data corresponding to the binocular content; and correcting the left-eye CGH data and the right-eye CGH data according to face information, motion information, haptic information or voice information of a user.

In an embodiment, the method may further include sensing the face, motion or voice of the user.

In an embodiment, the method may further include transmitting the left-eye CGH data and the right-eye CGH data to a display terminal.

In an embodiment, acquiring the binocular content for the object may include acquiring color information and depth information from a left-eye image for the object; and acquiring color information and depth information from a right-eye image for the object.

In an embodiment, acquiring the binocular content for the object may include acquiring color information and depth information for the object during a left-eye time for the object; and acquiring color information and depth information for the object during a right-eye time for the object.

In accordance with a further aspect of the present invention to accomplish the above object, there is provided a hologram content generation apparatus, including at least one processor; and a memory for storing at least one instruction that is executed by the at least one processor, wherein the at least one instruction is executed by the at least one processor so that binocular content for the object is acquired, left-eye computer-generated hologram (CGH) data and right-eye CGH data corresponding to the binocular content are generated, and the left-eye CGH data and the right-eye CGH data are corrected according to face information, motion information, haptic information or voice information of a user.

In an embodiment, the at least one instruction may be executed by the at least one processor so that the left-eye CGH data and the right-eye CGH data are read from a memory in which initial values are stored and so that option values for data corresponding to the face information, the motion information, the haptic information or the voice information of the user are added to the left-eye CGH data and the right-eye CGH data.

BRIEF DESCRIPTION OF THE DRAWINGS

The accompanying drawings are provided to help the understanding of the present embodiments and the embodiments are provided together with the detailed descriptions thereof. However, the technical features of the present embodiments are not limited to specific drawings, and the features disclosed in respective drawings may be combined to configure new embodiments.

DESCRIPTION OF THE PREFERRED EMBODIMENTS

Figure 1:
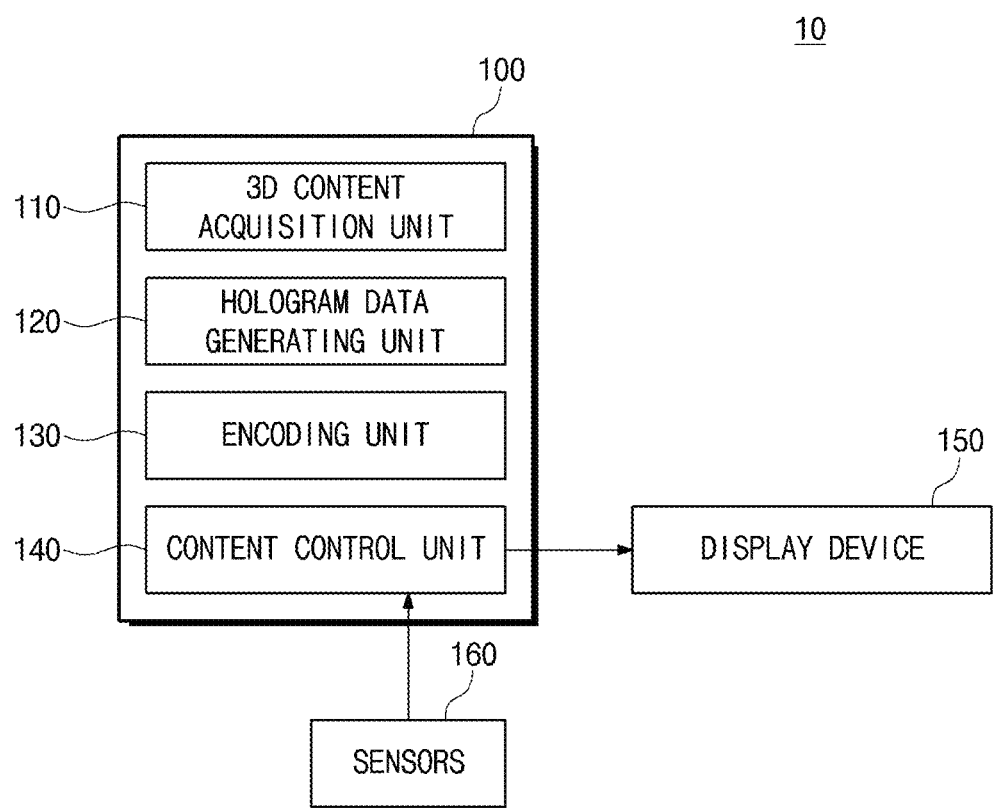
FIG. 1 is a diagram exemplarily illustrating an integrated hologram content control system according to an embodiment of the present invention.

Embodiments of the present invention are described with reference to the accompanying drawings in order to describe the present invention in detail so that those having ordinary knowledge in the technical field to which the present invention pertains can easily practice the present invention.

Reference will now be made in detail to various embodiments of the present invention, specific examples of which are illustrated in the accompanying drawings and described below, since the embodiments of the present invention can be variously modified in many different forms. However, this is not intended to limit the present invention to particular modes of practice, and it is to be appreciated that all changes, equivalents, and substitutes that do not depart from the spirit and technical scope of the present invention are encompassed in the present invention. It will be understood that, although the terms "first" and "second" may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element. It will be understood that when an element is referred to as being "coupled" or "connected" to another element, it can be directly coupled or connected to the other element, or intervening elements may be present therebetween. In contrast, it should be understood that when an element is referred to as being "directly coupled" or "directly connected" to another element, there are no intervening elements present.

The terminology used herein is for the purpose of describing particular embodiments only and is not intended to be limiting. In the present invention, the singular forms are intended to include the plural forms as well, unless the context clearly indicates otherwise. It should be further understood that the terms "comprise", "include", and "have", when used in this specification, specify the presence of stated features, integers, steps, operations, elements, components, and/or combinations thereof, but do not preclude the presence or addition of one or more other features, integers, steps, operations, elements, components, and/or combinations thereof. Unless differently defined, all terms used here including technical or scientific terms have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitely defined in the present specification.

A hologram content generation apparatus, an integrated hologram content control system having the hologram content generation apparatus, and a method for operating the hologram content generation apparatus according to embodiments of the present invention may generate content so that 3D information of an object based on an actual image is acquired and a full image is displayed by utilizing full 3D image-processing technology.

Recently, with the development of 3D display technology, an object is represented in perfect parallax and depth, thus removing eye fatigue and dizziness attributable to the problem of accommodation-convergence mismatch. Also, hologram display technology enables natural images to be viewed as if viewers were watching the real world along the movement of a viewpoint. However, in order to implement hologram display technology, there are several requirements.

First, since 360° image content for holography uses a very large amount of data based on various actual objects or Computer Graphics (CG), it is very difficult to implement technology for processing, in real time, images and optically reconstructing the processed images. Second, since such technology is developed using existing schemes for reconstructing images due to the great burden of computational throughput, content allowing a viewer to watch the content in a passive manner has been generated. Therefore, there is required the development of content that enables the experience of interaction between the user and content. Third, even if holographic content generated in this way is prepared, existing hologram devices or spatial light modulators (SLMs) capable of displaying such content have complicated optical systems. Since the existing hologram devices or SLMs have complicated optical systems so as to produce light having uniform intensity and excellent coherence, the volume of a system is large and is generally constructed on an optical table. Therefore, the need to develop a lightweight mobile hologram device that can be easily held in the user's hand or that is wearable on the user's face has continually increased.

Meanwhile, in order to realize a hologram display having a wide viewing angle, there is required a terminal for which a pixel pitch is less than 1 μm. In contrast, the pixel pitch of a current commercial panel that utilizes liquid crystal (LC) still remains at a level of only several μm to several tens of μm. This size provides a viewing angle of less than 5°. Therefore, a hologram is reproduced through a system to which separate expensive devices involving high-capacity and high-precision data-processing technology, such as eye-tracking technology, are attached.

The hologram content generation apparatus, the integrated hologram content control system having the hologram content generation apparatus, and the method for operating the hologram content generation apparatus according to embodiments of the present invention may enable holographic content having a wide viewing angle to be easily generated while providing a real-time interaction function between a user and a device for reconstructing a hologram image based on 360° 3D image information. In particular, it is possible to implement hologram content which enables interaction based on synesthesia (the sense of sight, the sense of touch, the sense of hearing, and gesture/action) between the user and a reconstructed 3D image in order to provide a sense of immersion and increased 3D realism to viewers while being suitable for application to portable virtual-reality (VR)/augmented-reality (AR) terminals or to mobile/wearable devices.

The hologram content generation apparatus, the integrated hologram content control system having the hologram content generation apparatus, and the method for operating the hologram content generation apparatus according to embodiments of the present invention may display hologram data at a wide viewing angle in association with information about the user's voice recognition and the user's gesture recognition, and may allow the user to interact with the hologram data.

The hologram content generation apparatus, the integrated hologram content control system having the hologram content generation apparatus, and the method for operating the hologram content generation apparatus according to embodiments of the present invention may receive an RGB-depth map as input information, and may perform calculation for high-speed hologram generation using a fast Fourier transform (FFT)-based computer-generated hologram (CGH) calculation formula, such as that given in the following Equation (1).

When a 3D space including a 3D scene is divided into multiple layers, if a hologram plane H, a viewer's observing view-window plane VW, and individual hierarchized layers are cut parallel to each other, point clouds that are almost continuously distributed may be assigned to the closest layer. Then, in order to calculate a complex number field on the hologram plane, the Fourier transform may be performed using an FFT algorithm.

$$U_{VW}(u,v) = \sum_{i=1}^{m} \frac{e^{\frac{\pi j}{\lambda d_i}(u^2+v^2)}}{j\lambda d_i} \frac{f}{d_i} \int\int U_i(x_i,y_i) e^{\frac{-2\pi j}{\lambda d_i}(ux_i+vy_i)} dx_i dy_i \quad (1)$$

$$U_H(x,y) = \frac{j}{\lambda f} \int\int U_{VW}(u,v) e^{-\frac{\pi j}{\lambda f}(u^2+v^2)} e^{\frac{2\pi j}{\lambda f}(xu+yv)} du dv \quad (2)$$

Here, (u, v), (xi, yi), Ui, f, e, and $d_i$ respectively denote the observing view-window plane VW of a viewer, an i-th layer of the 3D scene, an object field in the i-th layer, the focal length of a field lens, the wavelength of illuminance, and the viewing distance from the hologram plane. A depth map-based computer-generated hologram (CGH) calculated in this way may reconstruct the original 3D scene in the space. A viewer who observes the content while placing his or her eyes at the position of the view-window may view an optically reconstructed 3D scene.

FIG. 1 is a diagram exemplarily illustrating an integrated hologram content control system 10 according to an embodiment of the present invention. Referring to FIG. 1, the integrated hologram content control system 10 may include a hologram content generation apparatus 100, a display device 150, and a sensor unit 160.

The hologram content generation apparatus 100 may include a three-dimensional (3D) information acquisition unit 110, a hologram data generation unit 120, an encoding unit 130, and a content control unit 140.

The 3D content acquisition unit 110 may be implemented to acquire data that enables 3D information of a selected scene or object to be provided, or RGB color and depth (e.g. a depth map) information. Here, the format of data may include a format in which data is stored as point cloud information or a format in which data is stored as RGB-depth information.

The hologram data generation unit 120 may be implemented to calculate (generate) a complex hologram using a computer (i.e. a computer-generated holograms: CGH) and store generated hologram data in a specific memory folder.

In an embodiment, the hologram data generation unit 120 may receive RGB-depth-format data as input and then generate a computer-generated hologram (CGH). In an embodiment, the hologram data generation unit 120 may receive point-cloud-format data as input and then generate a CGH.

The encoding unit 130 may be implemented to correct CGH files calculated by the hologram data generation unit 120 in conformity with the characteristics of a display terminal and to aggregate the corrected CGH files in a form that can be easily transmitted.

The content control unit 140 may be implemented to transmit data composed of one hologram or a pair of at least two holograms, selected from among pieces of hologram data generated/stored by the hologram data generation unit 120 and the encoding unit 130.

The content control unit 140 may receive the selected hologram data transferred through a transmission unit, and may control the 3D content acquisition unit 110, the hologram data generation unit 120, and the encoding unit 130 so that the selected hologram data is converted into a format suitable for the display device 150, in which the selected hologram data is to be used, or so that additional encoding is performed. In an embodiment, the selected two holograms forming a pair may be pieces of hologram data respectively suitable for the left eye and the right eye of a viewer in consideration of the location in the space in which the hologram pair is to be reconstructed and the arrangement of optical devices.

In an embodiment, image content for left/right eyes may be generated/encoded based on the depth value z of a hologram image to be reconstructed in a 3D space and an interocular distance (x-y) so as to provide parallax suitable for the positions of the left/right eyes. That is, the selected image content for left/right eyes may be generated or encoded in consideration of spatial matching.

The display device 150 may reconstruct a hologram image in the 3D space by uploading the hologram data selected by the hologram content generation apparatus 100 and illuminating the hologram data with suitably prepared light in the uploaded state.

In an embodiment, the display device 150 may suitably display (upload) and reconstruct the hologram content data generated by the encoding unit 130.

In an embodiment, the display device 150 may be coupled to a rotation module that appropriately has a rotation function and a function of controlling rotation angle/speed/direction in response to a command from the sensor unit 160.

In an embodiment, the display device 150 may be coupled to the rotation module and the content control unit 140 that have a function of updating content in accordance with variation in the degrees of rotation angle/speed/direction in response to a command from the sensor unit 160.

In an embodiment, the display device 150 may include an interface with the rotation module and an interface with the content control unit. In an embodiment, the display device 150 may be coupled to the rotation module and the content control unit 140 to have a function of observing a reconstructed hologram image in an eye-position area of the user.

In an embodiment, in the rotation module, a unit step for a minimum rotation angle (i.e. angular unit for a rotational step) may be less than or equal to a minimum rotation angle that is used to acquire 360° digital 3D information at a 360° omnidirectional content generation step. For example, the unit step of the rotation module may be set to an angle less than or equal to 15°, or may be set, in detail, to an angle less than or equal to 0.35° (=360°/1024).

Figure 2:
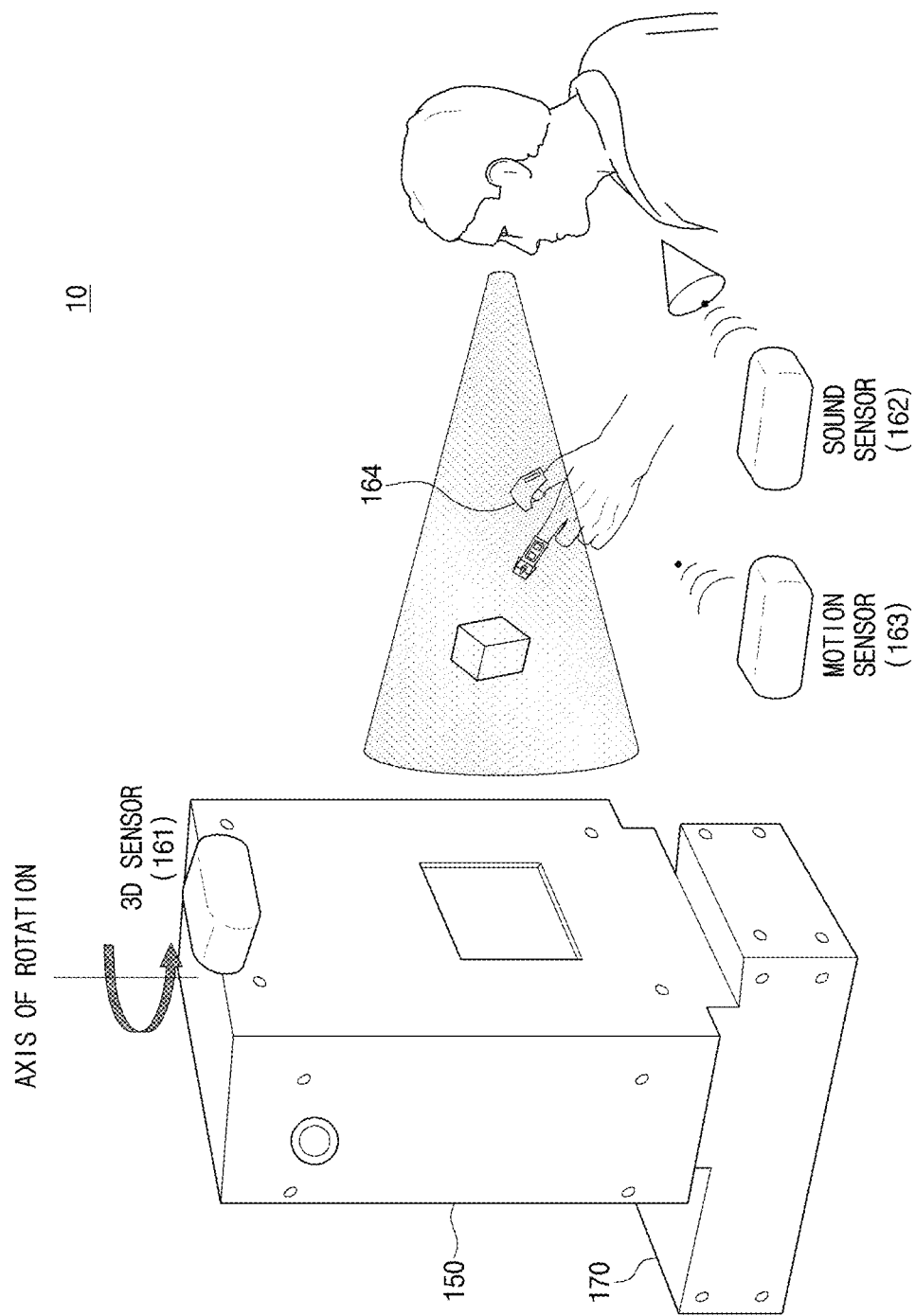
FIG. 2 is a diagram exemplarily illustrating an integrated hologram content control system for interaction between hologram content and a user.

FIG. 2 is a diagram exemplarily illustrating an integrated hologram content control system 10 for interaction between hologram content and a user. Referring to FIG. 2, the integrated hologram content control system 10 may include a display device 150 installed on a rotation module 170. The display device 150 may include a face recognition sensor 161, a sound (voice) sensor 162, a motion sensor 163, or a haptic sensor 164.

In an embodiment, the display device 150 may include a spatial light modulator and the face recognition sensor 161 (i.e. user's face tracking or eye tracking) for recognizing the user's face from the user. The face recognition sensor 161 may have a function of recognizing the positions of two eyes of the user when the user moves to the left or right while the user's face (or eyes) is spaced apart from the sensor by an appropriate distance. In an embodiment, the data recognized by the face recognition sensor 161 may be used to identify not only a face position but also a rotation (movement) direction, rotation (movement) angle, rotation (movement) speed, etc.

In an embodiment, the display device 150 may include a spatial light modulator and the sound sensor (user's voice sensor) 162 for recognizing the user's voice from the user. The voice sensor 162 may monitor the voice of the user who uses the display device 150, and may acquire/recognize information, such as a rotation direction, a rotation angle, and a rotation speed, according to instructions contained in the voice. In an embodiment, the data recognized by the voice sensor 162 may be used to identify the rotation direction, rotation angle, rotation speed, etc.

In an embodiment, the display device 150 may include a spatial light modulator and the motion sensor 163 (user's motion or gesture sensor) for recognizing the user's motion/gesture from the user. The motion sensor 163 may monitor the gesture of the user who uses the display device 150, and may acquire information, such as the position of the gesture, the direction of the gesture (up/down/left/right), and the speed of the gesture. Here, the acquired information may be input to a feedback program so that the hologram data generated by the hologram content generation apparatus 100 is selectively updated. In an embodiment, the hologram data matching the information acquired via the feedback program may be selected and read.

In an embodiment, the display device 150 may include a spatial light modulator and the haptic sensor (i.e. user's haptic gesture sensor) 164 for providing a haptic function to the user. The display device 150 based on the haptic sensor 164 may provide various types of sensory information, such as the sense of touch or a tactile sensation, to the user who uses the display device 150. Here, the acquired information may be input to the feedback program so that the hologram data generated by the hologram content generation apparatus 100 is selectively updated. In an embodiment, the hologram data matching the information acquired via the feedback program may be selected and read.

In an embodiment, the hologram data may be waited for in a standby state in which pre-calculation of CGH performed on given 3D content (so that CGH is updated in real time) is completed and is then prepared. In an embodiment, the read data may be transferred to the content control unit and then uploaded to the hologram display device 150 after passing through the transmission unit in the content control unit. Thereafter, in the uploaded state, the display device 150 is suitably illuminated with prepared light, and thus a hologram image may be reconstructed in the 3D space.

Meanwhile, the integrated control system 10 may include the rotation module 170 having a mount on which the display device 150 can be connected to be rotated, and a rotation module control unit (or a rotation control unit). In an embodiment, the rotation module control unit may rotate content and the display device 150 based on synchronization conditions to comply with the direction, rotation speed, and rotation angle corresponding to recognized voice (or face position) information in conjunction with voice recognition data (or face recognition data) by the user.

In an embodiment, when a hologram displayed on the display unit 150 is displayed in synchronization with the display device 150 while the display device 150 is rotating, a reconstructed image of the hologram may be observed as an optimal reconstructed hologram image in the binocular area of the user, as the result of the display.

In an embodiment, voice information to be input by the user to the voice sensor 162 may be used to issue a suitable voice command (to the left, to the right, faster, slower, further, etc.) so that the voice individually corresponds to the direction/speed/angle in which the facial center of the user is moving.

The integrated hologram content control system 10 for generating hologram content according to an embodiment of the present invention may break from a conventional complicated device for generating holograms and a conventional content calculation process, which takes a long time, while overcoming the limitations of passive hologram content generation based on conventional hologram generation using a computer.

The integrated hologram content control system 10 for generating hologram content according to an embodiment of the present invention may include binocular 3D holography for providing wide viewing-angle characteristics (e.g. an actual experimentally implemented angle of ±60° or more) so that the viewer is capable of comfortably viewing a reconstructed image even if an existing planar hologram terminal is used.

The integrated hologram content control system 10 for generating hologram content according to an embodiment of the present invention may allow each user to interact with various types (e.g. actual image or CG) of 360° omnidirectional hologram content in such a way that the user merely issues a voice command, changes his or her face position, or issues a gesture command, thus enabling interaction with real-time 3D content to be actively performed.

The integrated hologram content control system 10 for generating hologram content according to an embodiment of the present invention may allow viewers to more comfortably experience a fully realistic image in a wider visual space.

Since the integrated hologram content control system 10 for generating hologram content according to an embodiment of the present invention enables the implementation of a lightweight system and high-speed calculation processing, a sense of immersion and increased 3D realism may be provided to viewers while suitability for mobile applications that are personally portable is achieved, thus enabling interaction between each user and a reconstructed 3D image to be performed in real time.

Figure 3:
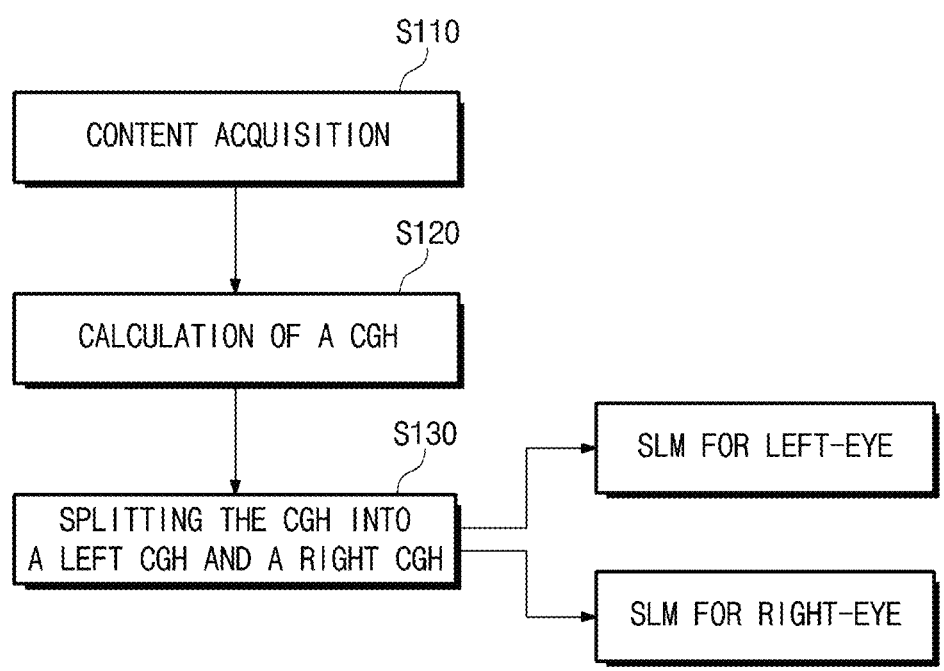
FIG. 3 is a flowchart exemplarily illustrating a method for operating a hologram content generation apparatus according to an embodiment of the present invention.

FIG. 3 is a flowchart exemplarily illustrating a method for operating the hologram content generation apparatus 100 according to an embodiment of the present invention. Referring to FIG. 3, the hologram content generation apparatus 100 may be operated as follows.

Binocular content for an object (left-eye content/right-eye content) may be acquired at step S110. Next, a computer-generated hologram (CGH) corresponding to the acquired binocular content may be calculated at step S120. The CGH may be split into a left-eye CGH and a right-eye CGH at step S130. Thereafter, the split left-eye CGH may be uploaded to a spatial light modulator (SLM) for the left eye of the display device 150, and the split right-eye CGH may be uploaded to an SLM for the right eye of the display device 150.

Figure 4A:
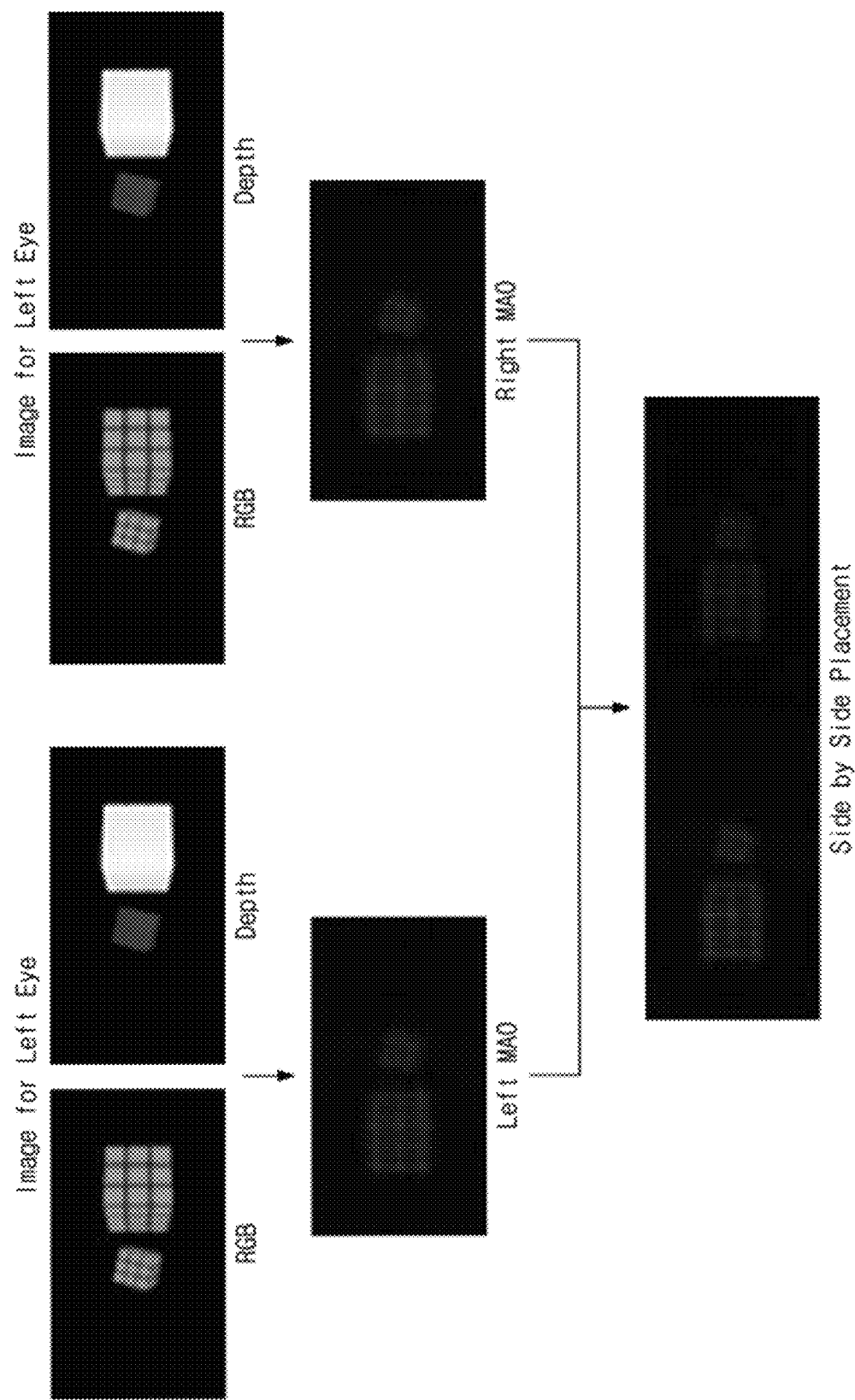
FIG. 4A is a diagram illustrating an embodiment of a process in which the hologram content generation apparatus generates and encodes hologram content that enables interaction between a user and a reconstructed image according to an embodiment of the present invention.

FIG. 4A is a diagram illustrating an embodiment of a process in which the hologram content generation apparatus 100 generates and encodes hologram content that enables interaction between a user and a reconstructed image according to an embodiment of the present invention.

The 3D content acquisition unit 110 may acquire 3D information that enables 3D information of a scene or object, selected by a left-eye sensor and a right-eye sensor, to be provided. For example, RGB color information for the left eye and depth information for the left eye may be acquired from a left-eye image. Further, RGB color information for the right eye and depth information for the right eye may be acquired from a right-eye image. Then, the 3D content acquisition unit 110 may combine the RGB color information for the left eye with the depth information for the left eye, and may combine the RGB color information for the right eye with the depth information for the right eye. Thereafter, the hologram data generation unit 120 may receive the combined RGB depth format information and generate left-eye CGH/right-eye CGH corresponding to the RGB depth format information.

Meanwhile, in FIG. 4A, the left-eye image and the right-eye image are respectively acquired from separate image sensors. However, it should be noted that the 3D content acquisition unit of the present invention is not limited thereto. The present invention may primarily acquire, from a single image sensor, a left-eye image and subsequently acquire a right-eye image after a predetermined time difference.

Figure 4B:
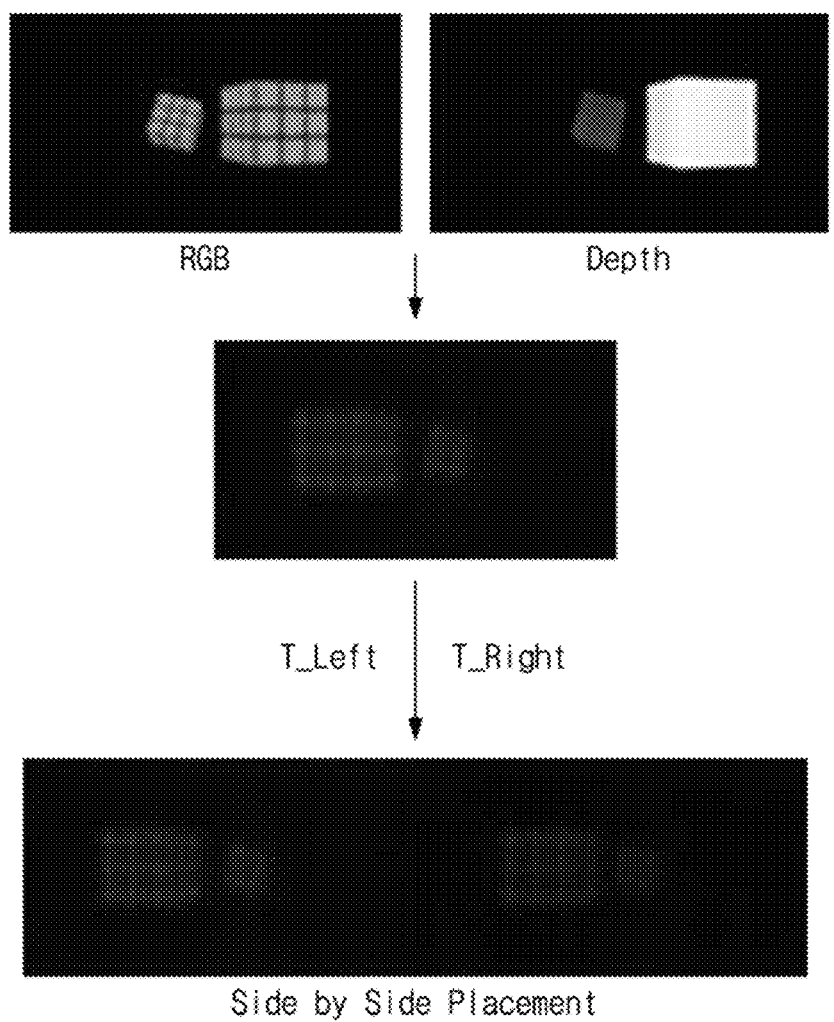
FIG. 4B is a diagram illustrating another embodiment of a process in which the hologram content generation apparatus generates and encodes hologram content that enables interaction between a user and a reconstructed image according to an embodiment of the present invention.

FIG. 4B is a diagram illustrating another embodiment of a process in which the hologram content generation apparatus 100 generates and encodes hologram content that enables interaction between a user and a reconstructed image according to an embodiment of the present invention. Referring to FIG. 4B, from a single image sensor, a left-eye image may be acquired and a left-eye CGH may be generated during a left-eye time T_Left, and after a predetermined time difference, a right-eye image may be acquired and a right-eye CGH may be generated during a right-eye time T_Right.

Meanwhile, an operating process in an integrated solution (control) system that enables interaction to be performed between user information and a reconstructed image according to an embodiment of the present invention will be described below.

Figure 5A:
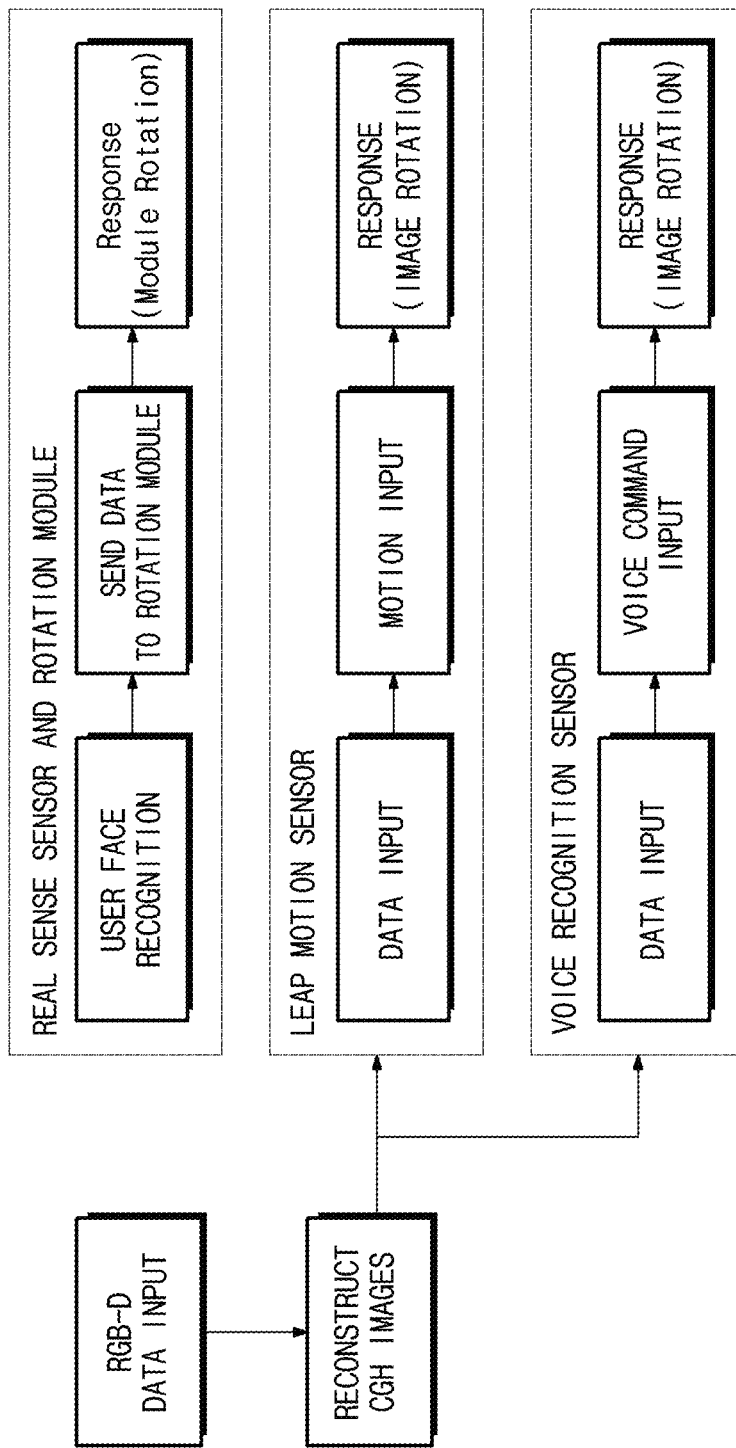
FIG. 5A is a diagram illustrating an embodiment of an integrated processing process (SW) for hologram content in the integrated hologram content control system according to an embodiment of the present invention.

FIG. 5A is a diagram illustrating an embodiment of an integrated processing process (SW) for hologram content in the integrated hologram content control system 10 according to an embodiment of the present invention. Referring to FIG. 5A, the integrated processing process may be operated in conjunction with a user recognition sensor, a motion sensor, and a user voice recognition sensor. In an embodiment, a rotation module may be rotated according to face information of the user recognized by the user recognition sensor. In an embodiment, hologram content may be rotated in response to information recognized by the motion sensor. In an embodiment, the hologram content may be rotated in response to voice information recognized by the voice sensor.

Meanwhile, the integrated processing process may add interaction that is performed in conjunction with a haptic sensor.

Figure 5B:
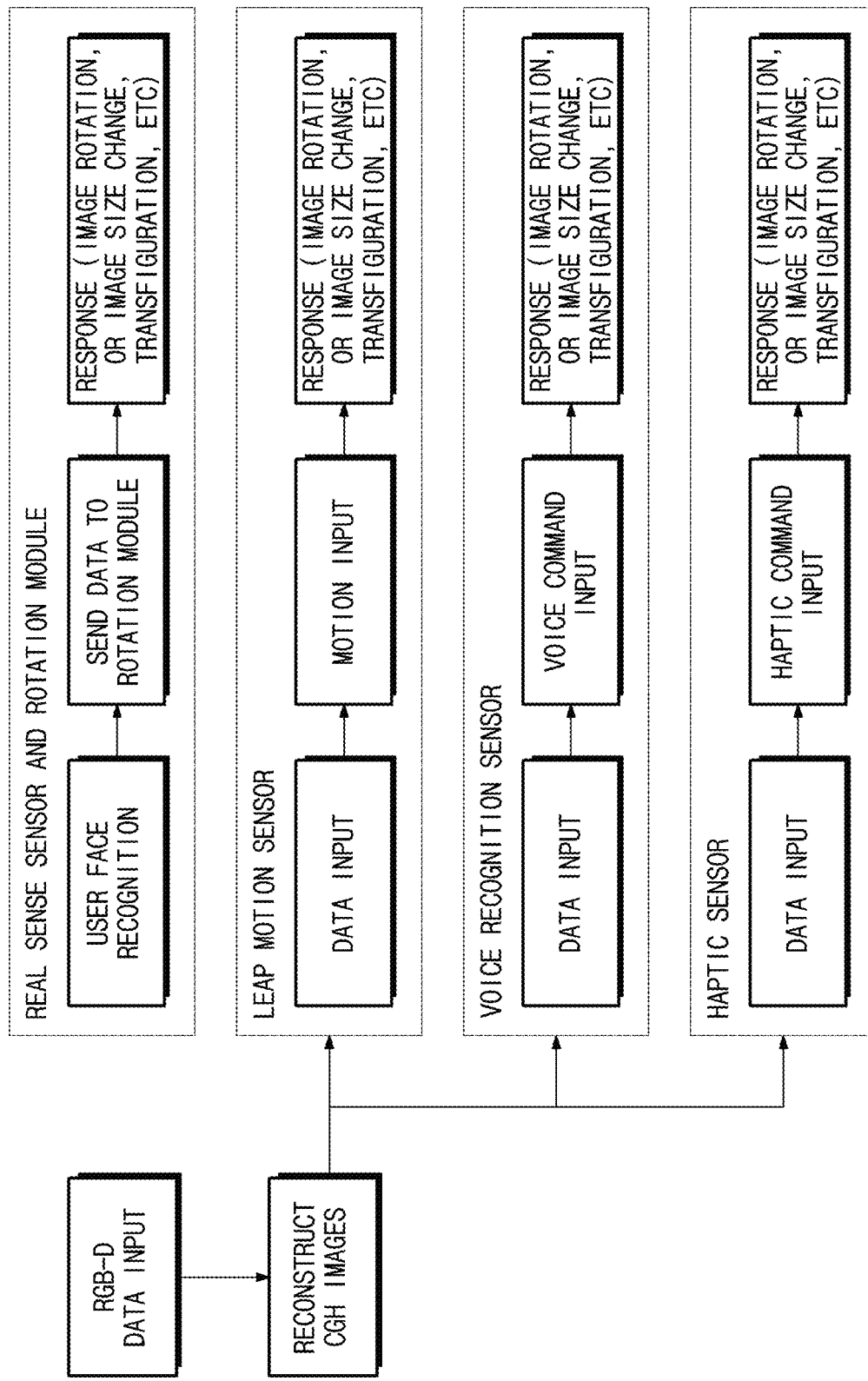
FIG. 5B is a diagram illustrating another embodiment of an integrated processing process (SW) for hologram content in the integrated hologram content control system according to an embodiment of the present invention.

FIG. 5B is a diagram illustrating another embodiment of an integrated processing process (SW) for hologram content in the integrated hologram content control system 10 according to an embodiment of the present invention. Referring to FIG. 5B, the integrated processing process may add interaction that is performed in conjunction with the haptic sensor compared to the process of FIG. 5A. Meanwhile, in FIG. 5B, functions of updating content in a form such as one achieved through image size change, transfiguration, or the like, in addition to image rotation, may be added.

Figure 6:
FIG. 6 is a diagram exemplarily illustrating the case where a display device and hologram content are updated in synchronization with each other according to a user's face based on recognition of the user's face.

FIG. 6 is a diagram exemplarily illustrating the case where a display device 150 and hologram content are updated in synchronization with each other according to a user's face based on recognition of the user's face. Referring to FIG. 6, the pupil of a user's eye is tracked and the display device 150 is rotated along with the tracked pupil at the same time that hologram content is displayed in consideration of the rotation.

Figure 7:
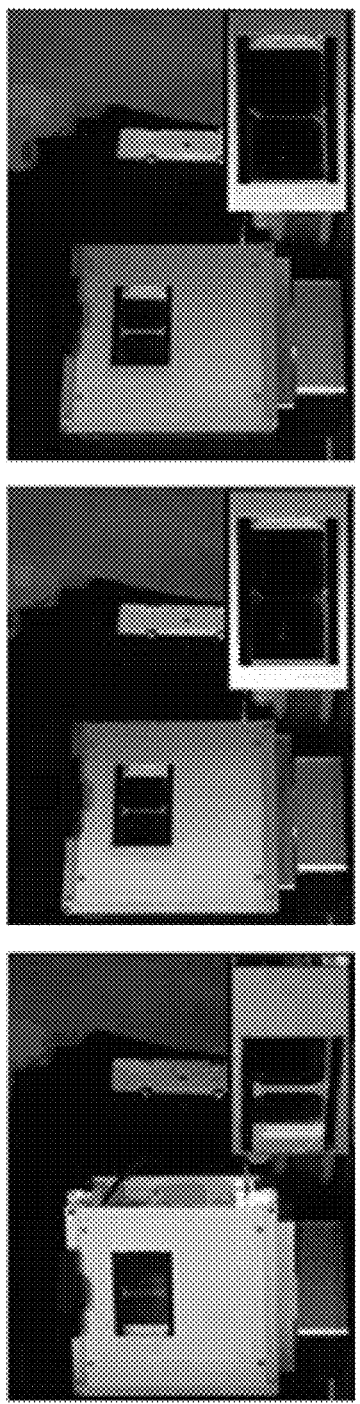
FIG. 7 is a diagram exemplarily illustrating the case where the display device and hologram content are rotated in synchronization with each other in response to a user voice command based on recognition of the user's voice.
Figure 7:
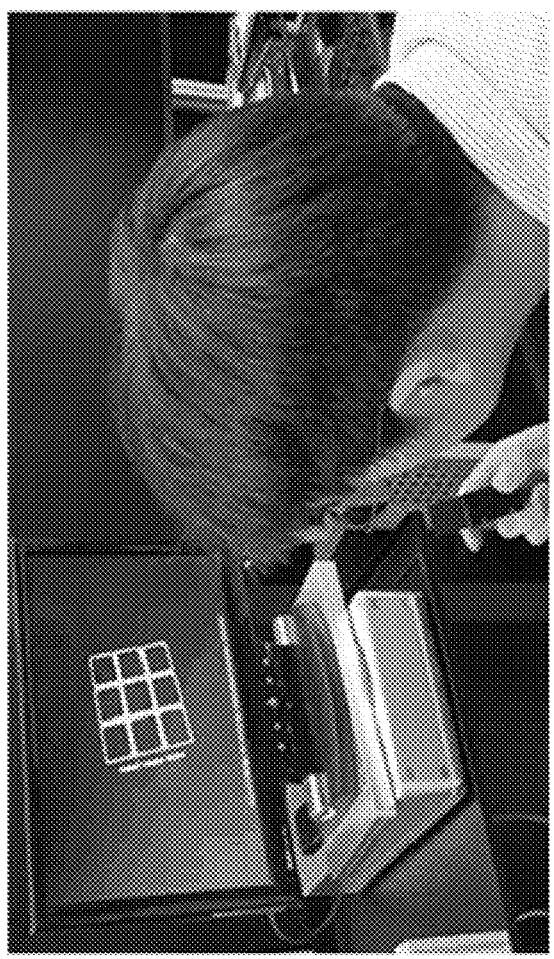

FIG. 7 is a diagram exemplarily illustrating the case where the display device 150 and hologram content are rotated in synchronization with each other in response to the user's voice command based on recognition of the user's voice. Referring to FIG. 7, the hologram content may be rotated in response to the user's voice command.

Figure 8:
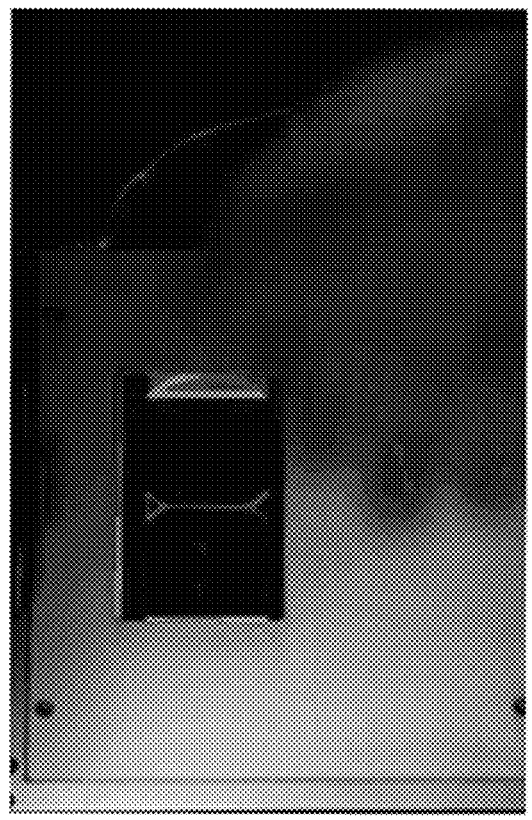
FIG. 8 is a diagram exemplarily illustrating the case where hologram content is rotated in response to a gesture command based on recognition of the user's gesture.
Figure 8:
Figure 8:
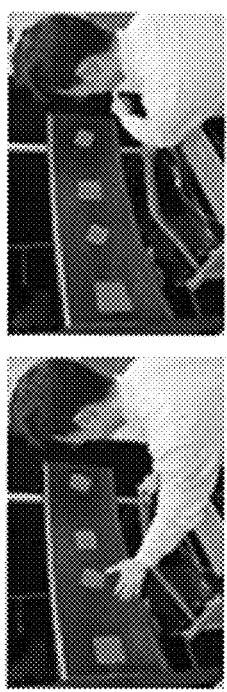

FIG. 8 is a diagram exemplarily illustrating the case where hologram content is rotated in response to a gesture command based on recognition of the user's gesture. Referring to FIG. 8, hologram content may be moved in response to the user's gesture command (e.g. the command of moving the right hand to the left or the command of moving the left hand to the right).

Figure 9:
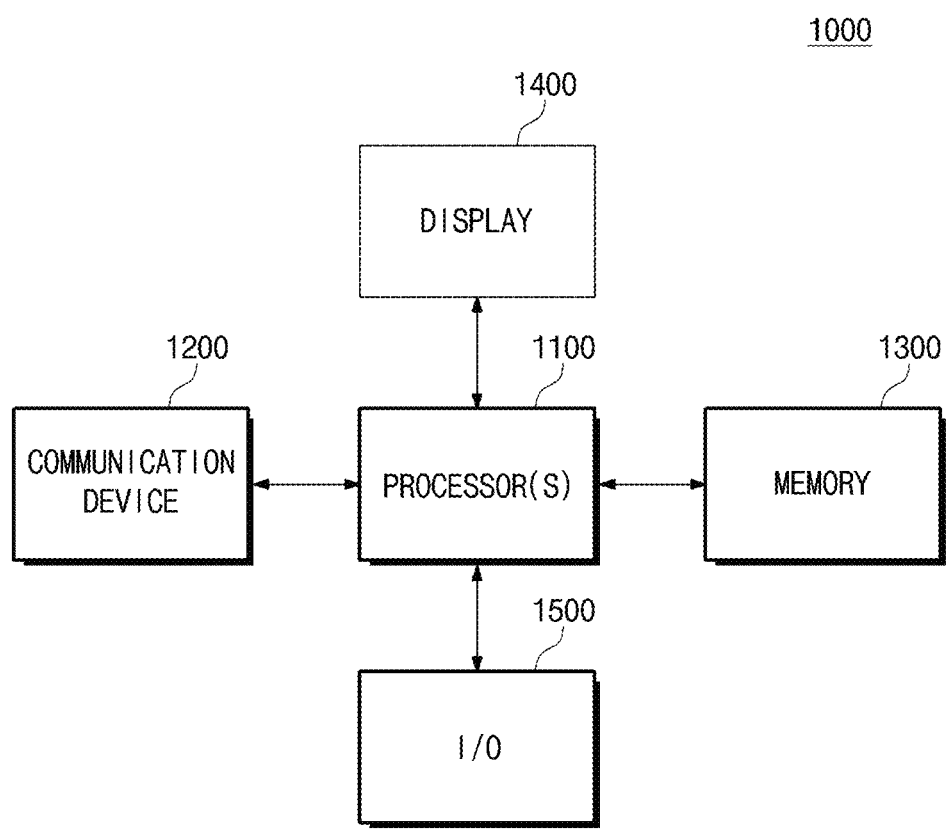
FIG. 9 is a diagram exemplarily illustrating the hologram content generation apparatus according to an embodiment of the present invention.

FIG. 9 is a diagram exemplarily illustrating a hologram content generation apparatus 1000 according to an embodiment of the present invention. The hologram content generation apparatus 1000 may include at least one processor 1100, a network interface (communication device) 1200, memory 1300, a display 1400, and an input/output device 1500.

The processor 1100 may include at least one of the apparatuses (or devices) described above with reference to FIGS. 1 to 8, or may be implemented using at least one of the methods described above with reference to FIGS. 1 to 8. As described above, the processor 1100 may execute instructions so that binocular content for an object is acquired and so that left-eye computer-generated hologram (CGH) data and right-eye CGH data corresponding to the binocular content are generated and are corrected according to the face, motion or voice of the user.

The processor 1100 may execute a program, and may control the hologram content generation apparatus 1000. The hologram content generation apparatus 1000 may be connected to an external device (e.g. a personal computer or a network) through the input/output device 1500, and may exchange data with the external device.

The network interface 1200 may be implemented to perform communication with an external network in various wired/wireless manners.

The memory 1300 may include computer-readable instructions. The processor 2100 may perform the above-described operations when the instructions stored in the memory 1300 are executed on the processor 1100. The memory 1300 may be volatile memory or nonvolatile memory.

The memory 1300 may include a storage device to store data of a user. The storage device may be an Embedded Multimedia Card (eMMC), a Solid-State Drive (SSD), universal flash storage (UFS), or the like. The storage device may include at least one nonvolatile memory device. The nonvolatile memory device may be any one of NAND flash memory, Vertical NAND (VNAND) flash memory, NOR flash memory, Resistive Random Access Memory (RRAM), Phase-Change Memory (PRAM), Magnetoresistive Random Access Memory (MRAM), Ferroelectric Random Access Memory (FRAM), and Spin Transfer Torque Random Access Memory (STT-RAM).

The above-described embodiments may be implemented using hardware components, software components, and/or combinations of hardware components and software components. For example, the apparatus (device), method, and components described above in the embodiments may be implemented using one or more general-purpose computers or special-purpose computers, as in the case of a processor, a controller, an Arithmetic Logic Unit (ALU), a digital signal processor, a microcomputer, a Field-Programmable Gate Array (FPGA), a Programmable Logic Unit (PLU), a microprocessor, or any other device capable of executing and responding to instructions. A processing device may execute an Operating System (OS) and one or more software applications running on the OS.

Further, the processing device may access, store, handle, process and generate data in response to the execution of software. For convenience of understanding, there is the case where a single processing device is described as being used, but those skilled in the art to which the corresponding technical fields pertain will understand that the processing device may include multiple processing elements and/or multiple types of processing elements. For example, the processing device may include multiple processors, or a single processor and a single controller. Furthermore, the processing device may include an additional processing configuration such as one including parallel processors.

The software may include a computer program, code, an instruction, or a combination of one or more thereof, and may configure the processing device so that the processing device is operated in a desired manner, or may independently or collectively issue commands to the processing device. The software and/or data may be interpreted by the processing device or may be permanently or temporarily embodied in a certain type of machine, a component, a physical device, virtual equipment, a computer-storage medium or device, or a signal wave to be transmitted so as to provide commands or data to the processing device. The software may be distributed to computer systems connected over a network, and may also be stored or executed in a distributed manner. The software and data may be stored in one or more computer-readable storage media.

The hologram content generation apparatus 1000 according to an embodiment of the present invention may include at least one processor 1100 and memory 1300 for storing at least one instruction executed by the at least one processor 1100, wherein the at least one instruction may be executed by the at least one processor so that binocular content for an object is acquired and left-eye CGH data and right-eye CGH data corresponding to the binocular content are generated and so that the left-eye CGH data and right-eye CGH data are corrected according to the face, motion or voice of the user.

In an embodiment, the at least one instruction may be executed by the at least one processor so that left-eye CGH data and right-eye CGH data are read from memory in which initial values are stored and so that option values for data corresponding to the face, motion or voice of the user are added to the read left-eye CGH data and the read right-eye CGH data.

The method according to the embodiment may be implemented in program instructions that can be executed through various types of computer means, and may be recorded in a computer-readable storage medium. The computer-readable storage medium may include a program instruction, a data file, a data structure, etc. alone or in combination. The program instruction recorded in the medium may be designed and configured especially for embodiments or may be known to and used by those skilled in computer software fields.

Examples of the computer-readable storage medium may include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and vice versa.

The hologram content generation apparatus, the integrated hologram content control system having the hologram content generation apparatus, and the method for operating the hologram content generation apparatus according to embodiments of the present invention may break from a conventional complicated device for generating holograms and a conventional content calculation process, which takes a long time, while overcoming the limitations of passive hologram content generation based on conventional hologram generation using a computer.

The hologram content generation apparatus, the integrated hologram content control system having the hologram content generation apparatus, and the method for operating the hologram content generation apparatus according to embodiments of the present invention may provide wide viewing-angle characteristics based on binocular 3D holography so that a viewer is capable of comfortably viewing a reconstructed image even if an existing planar hologram terminal is used.

The hologram content generation apparatus, the integrated hologram content control system having the hologram content generation apparatus, and the method for operating the hologram content generation apparatus according to embodiments of the present invention may allow each user to interact with various types (e.g. actual image or CG) of 360° omnidirectional hologram content in such a way that the user merely issues a voice command, changes his or her face position, or issues a gesture command, thus enabling interaction with real-time 3D content to be actively performed.

The hologram content generation apparatus, the integrated hologram content control system having the hologram content generation apparatus, and the method for operating the hologram content generation apparatus according to embodiments of the present invention may allow viewers to more comfortably experience a fully realistic image in a wider visual space.

The hologram content generation apparatus, the integrated hologram content control system having the hologram content generation apparatus, and the method for operating the hologram content generation apparatus according to embodiments of the present invention may enable the implementation of a lightweight system and high-speed calculation processing, so that the effect of a sense of immersion and increased 3D realism may be expected by viewers while suitability for mobile applications that are personally portable is achieved.

The hologram content generation apparatus, the integrated hologram content control system having the hologram content generation apparatus, and the method for operating the hologram content generation apparatus according to embodiments of the present invention may enable interaction between the user and a reconstructed 3D image to be performed in real time.

Meanwhile, the above description of the present invention merely shows detailed embodiments for practicing the present invention. The present invention may include not only a detailed means that can be actually utilized, but also a technical spirit that is an abstract and conceptual idea and that can be used as technology in the future.

What is claimed is:

1. An integrated hologram content control system, comprising:
   a sensor unit configured to sense at least one of a face, motion, and voice of a user and generate sensing information;
   a hologram content generation apparatus configured to generate hologram content that enables interaction with the user using the sensing information;
   a display device configured to display the generated hologram content; and
   a rotation module configured to rotate the display device,
   wherein the hologram content generation apparatus generates binocular hologram data for providing a wide viewing angle; and
   wherein the hologram content generation apparatus acquires 3D information of a scene or an object selected by a left-eye sensor and a right-eye sensor during a left-eye time and a right-eye time, the left-eye time and the right-eye time being separated by a predetermined time difference.

2. The integrated hologram content control system of claim 1, wherein the sensor unit comprises a face recognition sensor configured to recognize positions of two eyes of the user.

3. The integrated hologram content control system of claim 2, wherein the face recognition sensor identifies a movement direction, a movement angle, and a movement speed of the user.

4. The integrated hologram content control system of claim 2, wherein the rotation module is controlled based on data sensed by the face recognition sensor.

5. The integrated hologram content control system of claim 4, wherein the rotation module is controlled by a unit step for a rotation angle, which is 15° or less.

6. The integrated hologram content control system of claim 1, wherein the sensor unit comprises a voice sensor configured to recognize a voice of the user.

7. The integrated hologram content control system of claim 6, wherein a rotation direction, a rotation angle or a rotation speed of the hologram content is determined based on data sensed by the voice sensor.

8. The integrated hologram content control system of claim 1, wherein the sensor unit comprises a motion sensor configured to recognize a motion or gesture of the user.

9. The integrated hologram content control system of claim 8, wherein a rotation direction, a rotation angle or a rotation speed of the hologram content is determined based on data sensed by the motion sensor.

10. The integrated hologram content control system of claim 1, wherein the sensor unit comprises a haptic sensor configured to sense a touch on the hologram content.

11. An operating method of a hologram content generation apparatus, comprising:
   acquiring binocular content for an object;
   generating left-eye computer-generated hologram (CGH) data and right-eye CGH data corresponding to the binocular content; and
   correcting the left-eye CGH data and the right-eye CGH data according to face information, motion information, haptic information or voice information of a user,
   wherein acquiring the binocular content for the object comprises acquiring color information and depth information from a left-eye image for the object during a left-eye time for the object and acquiring color information and depth information from a right-eye image for the object during a right-eye time for the object, the left-eye time and the right-eye time being separated by a predetermined time difference.

12. The method of claim 11, further comprising sensing the face, motion or voice of the user.

13. The method of claim 11, further comprising transmitting the left-eye CGH data and the right-eye CGH data to a display terminal.

14. A hologram content generation apparatus, comprising:
at least one processor; and
a memory configured to store at least one instruction that is executed by the at least one processor,
wherein the at least one instruction is executed by the at least one processor so that: binocular content for the object is acquired, left-eye computer-generated hologram (CGH) data and right-eye CGH data corresponding to the binocular content are generated, and the left-eye CGH data and the right-eye CGH data are corrected according to face information, motion information, haptic information or voice information of a user, and
wherein the acquiring the binocular content for the object comprises acquiring color information and depth information from a left-eye image for the object during a left-eye time for the object and acquiring color information and depth information from a right-eye image for the object during a right-eye time for the object, the left-eye time and the right-eye time being separated by a predetermined time difference.

15. The hologram content generation apparatus of claim 14, wherein the at least one instruction is executed by the at least one processor so that the left-eye CGH data and the right-eye CGH data are read from a memory in which initial values are stored and so that option values for data corresponding to the face information, the motion information, the haptic information or the voice information of the user are added to the left-eye CGH data and the right-eye CGH data.

* * * * *